Sept. 25, 1951  L. L. KUEMPEL  2,569,009
REFRIGERATING APPARATUS FOR VEHICLES
Filed Feb. 4, 1949  3 Sheets-Sheet 1
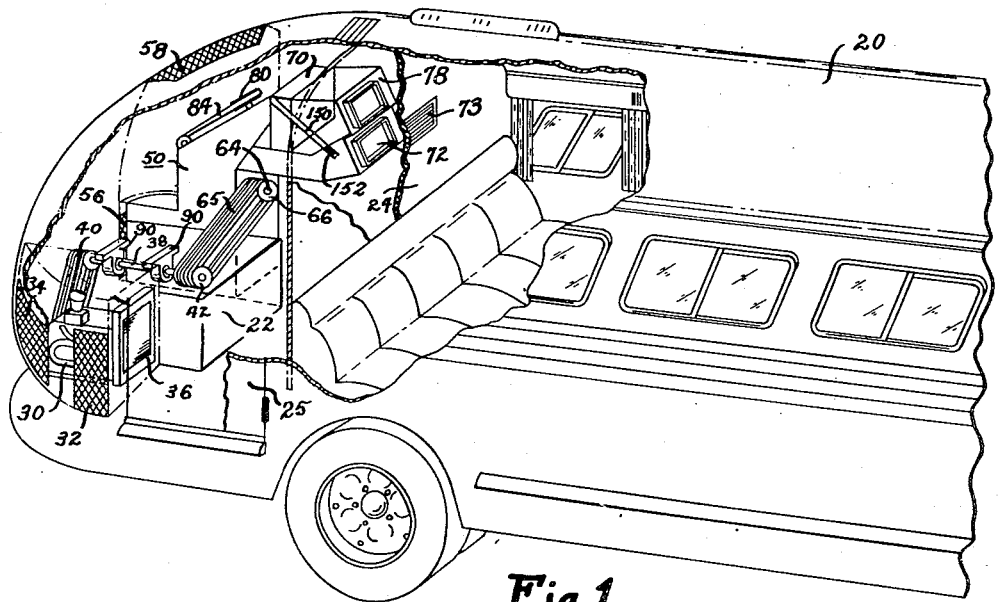
Fig. 1
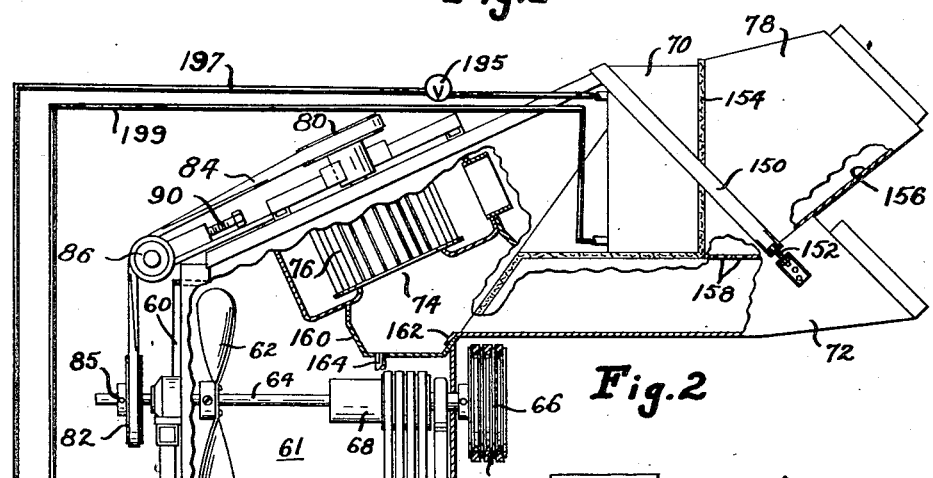
Fig. 2
Fig. 10
INVENTOR,
Leon L. Kuempel,
By Dybvig & Dybvig,

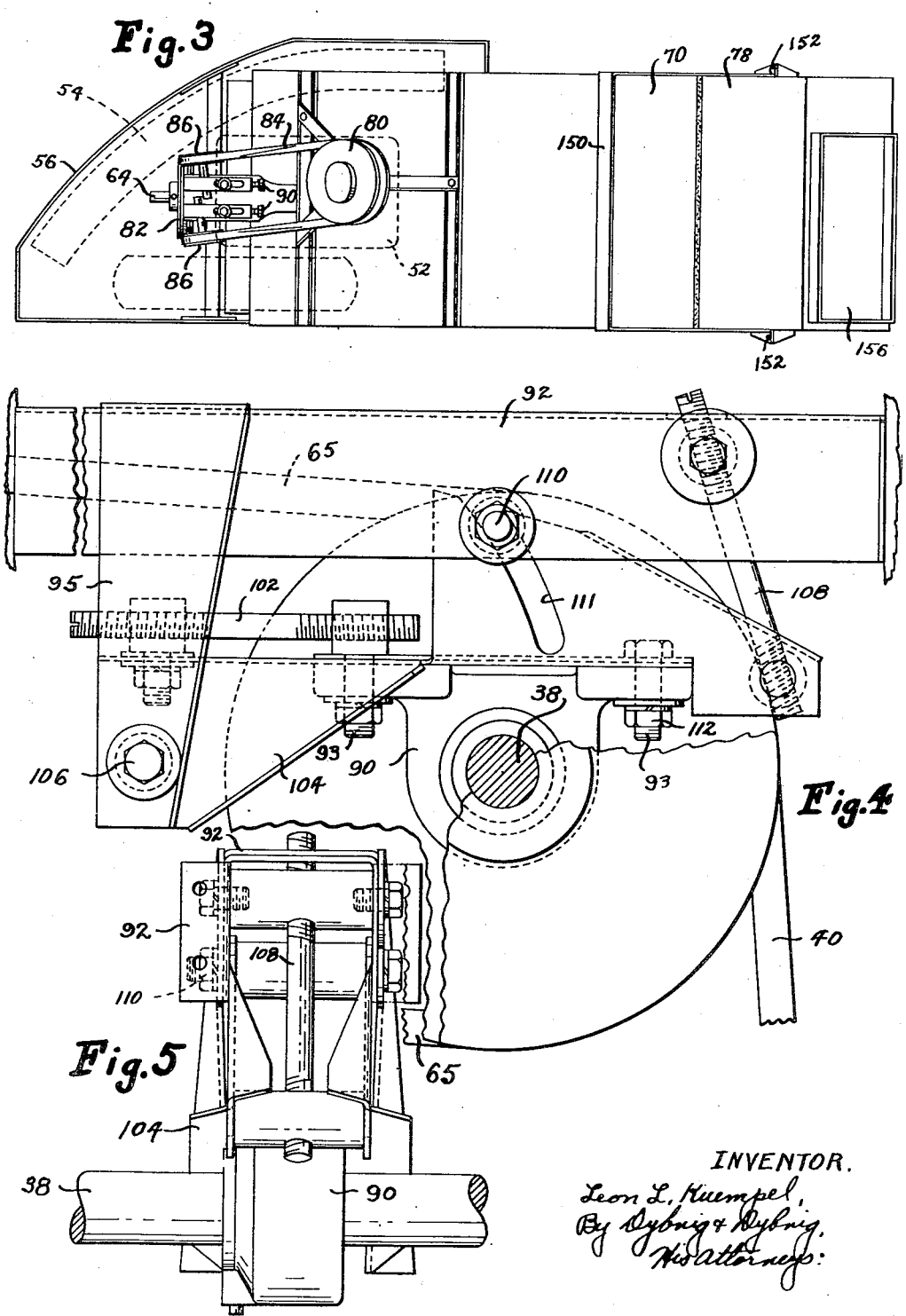

Sept. 25, 1951 L. L. KUEMPEL 2,569,009
REFRIGERATING APPARATUS FOR VEHICLES
Filed Feb. 4, 1949 3 Sheets-Sheet 3

INVENTOR,
Leon L. Kuempel,
By Dybvig & Dybvig
His Attorneys

Patented Sept. 25, 1951

2,569,009

UNITED STATES PATENT OFFICE 2,569,009

REFRIGERATING APPARATUS FOR VEHICLES

Leon L. Kuempel, Cincinnati, Ohio

Application February 4, 1949, Serial No. 74,559

15 Claims. (Cl. 62—6)

This invention relates to air conditioning apparatus and more particularly to a self-contained unit for use in buses and the like.

One object of this invention is to provide an air conditioning system in which the parts are compactly arranged and at the same time are readily accessible for servicing, inspection and repair purposes.

Another object of this invention is to provide an air conditioning system which may be readily installed or removed.

Another object of this invention is to provide an air conditioning system in which the prime mover for the system is mounted separately from the refrigerating apparatus whereby it is possible to replace the prime mover without interfering with the refrigerating apparatus and vice versa.

Another object of this invention is to provide an improved arrangement for disposing of the condensate.

Another object of this invention is to provide an improved jack shaft arrangement for transmitting power from the prime mover to the refrigerating apparatus whereby it is possible to maintain proper tension on all of the belts connected to the jack shaft.

Another object of this invention is to provide an improved coil construction capable of withstanding the jarring and vibration to which it is subjected on a bus.

Another object is to provide an improved arrangement of heat exchange units and air circulating means which eliminates the need for expensive and space consuming ducts.

Another object of this invention is to provide air conditioning equipment so constructed and arranged that it may be fitted into the two rear corners of the baggage compartment of a modern streamlined bus.

More particularly, it is an object of this invention to provide an air conditioning system in which it is possible to mount the prime mover and the refrigerating system on opposite sides of the main bus engine.

Other objects and advantages reside in the construction of parts, the combination thereof and the mode of operation, as will become more apparent from the following description.

In the drawings:

Figure 1 is a perspective view, partly schematic, showing the general arrangement of the parts within the bus;

Figure 2 is an elevational view of the air conditioning unit with parts broken away;

Figure 3 is a plan view of the air conditioning unit;

Figure 4 is a side elevational view showing the jack shaft supporting structure;

Figure 5 is an end elevational view showing the jack shaft supporting structure;

Figure 10 is a diagrammatic view of the speed control mechanism.

Figures 6, 7, 8:
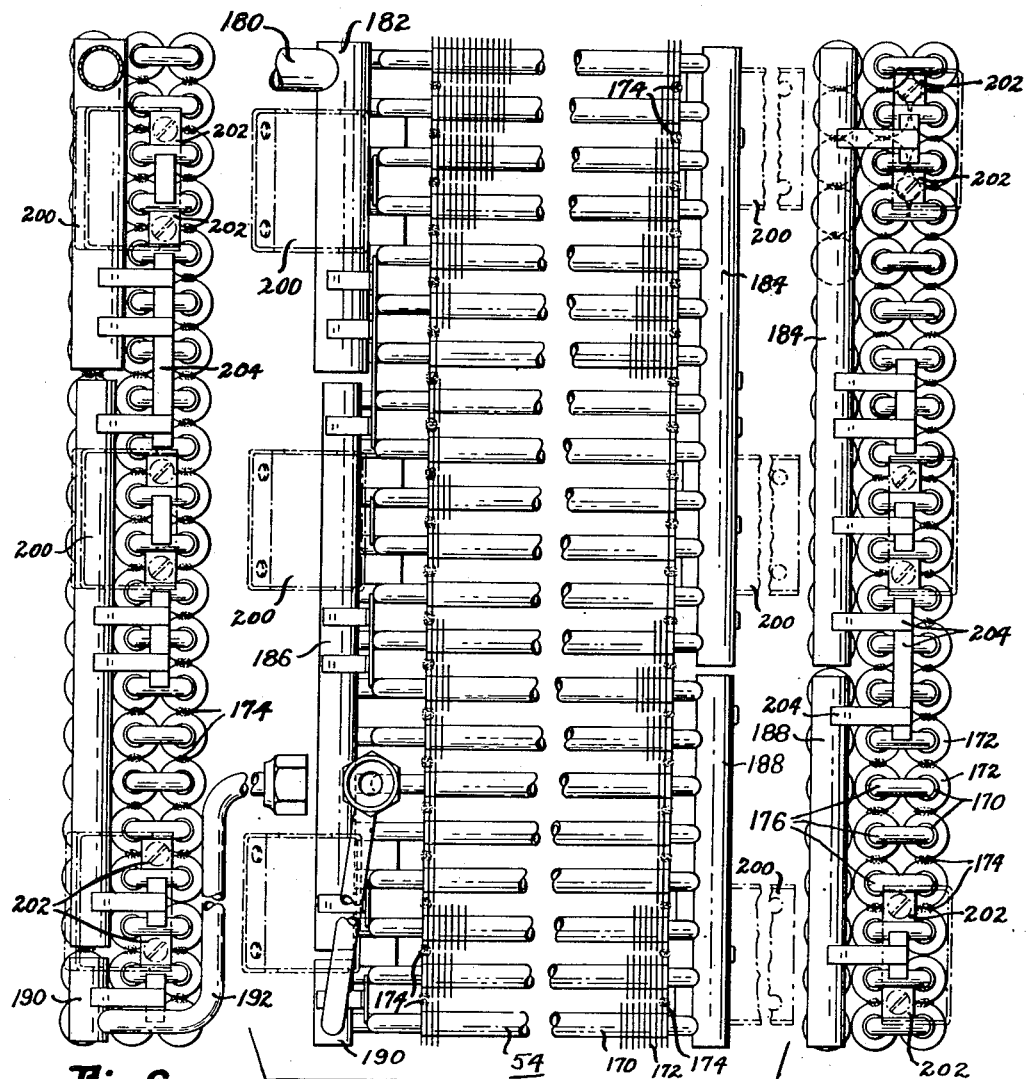
Figure 6 is an end elevational view of one end of the condenser.
Figure 7 is a side elevational view of the condenser.
Figure 8 is an end elevational view of the other end of the condenser.
Figure 9:
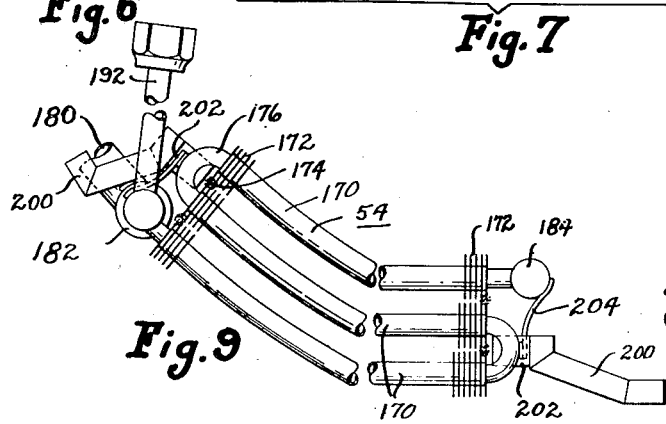
Figure 9 is a fragmentary plan view of the condenser.

Referring now to the drawings wherein I have shown a preferred embodiment of my invention, reference numeral 20 designates a conventional bus chassis wherein the engine 22 which supplies power for driving the bus is located in the center rear portion of the bus as shown. The bus 20 shown herein is intended to represent a modern streamlined bus of the type in which a wall 24 separates the passenger compartment from the baggage compartment and/or engine compartment and in which a door 26 leads into this latter compartment. The air conditioning equipment has purposely been so constructed and arranged that it occupies the two rear corners and consequently does not require the use of valuable space.

As indicated in Figure 1 of the drawings, the engine or prime mover 30, which supplies power for operating the air conditioning apparatus, is mounted on the right side of the bus engine 22. Being the engine is small, it does not require much head room and may be mounted at the rear corner of the bus where the ceiling height is low. Air for cooling the engine 30 enters the engine compartment through a side air inlet grill 32 and leaves the engine compartment through the rear outlet grill 34. The engine is provided with the usual engine radiator 36 at the front of the engine and the usual fan (not shown) for circulating air through the engine compartment. A jack shaft 38, which is mounted almost directly above the engine, is belted to the drive shaft of the engine by means of a plurality of V-belts 40 which are arranged as shown. The front end of the jack shaft 38 is provided with suitable V-pulleys 42 for a purpose to be explained more fully hereinafter.

The air conditioning unit is a self-contained unit which has been designated by the reference numeral 50 and which is adapted to fit into the left rear corner of the bus as shown in Figure 1 of the drawings. The shape of the air conditioning unit 50 is such that it requires a minimum amount of space and largely eliminates the need for special air ducts. The air conditioning unit comprises a conventional compressor 52 which is mounted in the lower part of the unit 50. The refrigerant condenser 54 is located alongside the compressor 52 adjacent the rear corner wall of the bus, with the result that the air circulated over the condenser passes directly to the exterior of the bus through the air outlet grill 56. The air for cooling the condenser enters the space above the unit 50 through the air inlet grill 58 (see Figure 1) and enters the unit 50 through the condenser air inlet 60 and is forcefully circulated through the compressor and condenser compartment 61 by means of the fan 62 which is mounted directly on the jack shaft 64 located in the upper portion of the compressor and condenser compartment 61. The front end of the jack shaft 64 is provided with V-pulleys 66 which are belted to the V-pulleys 42 on the jack shaft 38 (mounted on the opposite side of the bus) by means of belts 65 as indicated in Figure 1 of the drawings. The compressor 52 is driven from the jack shaft 64 through the V-belts 67 and a centrifugal clutch arrangement 68 which operates to declutch the compressor from the jack shaft at the lower engine speeds for a purpose to be explained more fully hereinafter.

The refrigerant evaporator 70 is mounted above and forwardly of the rest of the refrigeration equipment as best shown in Figure 2. Air to be conditioned enters the air conditioning unit 50 through the return air duct 72 which directs the incoming air into the inlet 74 of the evaporator fan 76. The duct 72 is adapted to be connected to the usual return air opening 73 provided in the rear wall 24 of the passenger compartment. The evaporator fan 76 is a conventional centrifugal fan which is arranged to forcefully direct the air to be conditioned forwardly through the evaporator coil 70. The air leaving the evaporator 70 is directed into the passenger compartment of the bus by means of a short duct section 78 which will be described more fully hereinafter and which is adapted to connect onto the conventional air distributing ducts (not shown) built into the bus body.

The evaporator fan 76 is provided with a drive pulley 80, as shown, which is belted to a drive pulley 82 mounted on the rear end of the jack shaft 64 as shown. The belt 84, which drives the evaporator fan, passes over a pair of idler pulleys 86 which are individually adjustably mounted on the wall of the air conditioning unit 50 so that when it is necessary to tighten the belt 84, this may be done by adjusting the belt tightening screws 96 (see Figures 2 and 3) which serves to shift the idler pulleys toward the rear. By loosening the set screw 85, the pulley 82 may be shifted so as to line it up with the belt 84.

By virtue of this belt arrangement, it is obvious that the engine 30 supplies all of the power necessary for operating the refrigerant compressor 52, the condenser fan 62 and the evaporator fan 76. This belt arrangement not only saves the expense of providing separate prime movers for the various air circulating fans but also makes it possible to use pulleys of suitable sizes for obtaining the desired operating speeds for the various driven elements.

In order to provide for adjustment of the belts leading from the engine 30 to the jack shaft 38 and from the jack shaft 38 to the jack shaft 64, there is provided a special mounting (not fully shown in Figure 1 but shown in detail in Figures 4 and 5) for the jack shaft 38 which comprises a pair of stationary struts 92 which are suitably supported on the bus chassis adjacent the opposite ends of the jack shaft 38. These two struts are similar in construction and consequently only one will be described in detail. Referring now to Figures 4 and 5 of the drawings wherein I have shown the manner in which the one end of the jack shaft 38 is supported from one of the struts 92, reference numeral 90 designates a bearing which is slidably mounted on a pivoted bracket 104 which in turn is carried by the strut 92. The position of the bearing 90 relative to the strut 92 is adjustably controlled by a conventional adjusting screw 102 which when rotated serves to horizontally shift the bearing 90 on the bearing supporting bracket 104. The bearing 90 is held in adjustment by the bolts 93. Adjustment of the screw 102 serves only to adjust the tension of the belt 65 and has very little, if any, effect on the tension of the belt 40, since the belt 40 extends substantially at right angles to the direction of such movement of the jack shaft 38.

In order to adjust the tension of the belt 40, each of the bearing supporting brackets 104 pivots about its supporting pin 106 carried by the depending arm 95 provided on the strut 92. The arrangement of the bracket 104 is such that by adjusting the screw 108, the shaft 38 will be raised and lowered through an arc which will have very little effect on the amount of tension on the horizontally arranged belt 65.

By virtue of the above described arrangement, it is obvious that adjustment of the screw 108 serves primarily to adjust the tension of the belt 40 and likewise adjustment of the screw 102 serves primarily to adjust tension of the belt 67 without materially interfering with the tension of the belt 40. After the tension on the belt 40 has been properly adjusted, the pivoted jack shaft supporting bracket 104 may be held against further shifting by tightening the bolt 110 which engages within the slot 111 of the bracket 104 as shown.

In referring to Figures 1, 2, and 3, it will be observed that the external contour of the air conditioning unit 50 is such that it fits into the left rear corner of the bus and that the condenser 54 is shaped to correspond to the contour of the bus body. It will also be noted that the evaporator 70 is arranged so as to project forwardly an appreciable amount from the lower portion of the unit 50 and that the short return air and conditioned air duct sections 72 and 78 respectively are removably held in place on the unit 50 by means of the U-shaped mounting strap 150 which is secured to the unit 50 and carries duct supporting bolts 152 (see Figure 2). A gasket 154 is provided at the joint between the removable duct sections and the relatively stationary part of the cabinet 50.

It will be observed that the air leaving the evaporator 70 is deflected upwardly by the inner wall 156 of the duct section 78. The relationship of the wall 156 and the evaporator 70 is such that droplets of water which may be entrained by the air flowing through the evaporator will collect on the wall 156 and will drain into the lower portion of the supply air duct section 78 where holes 158 permit the water to drain into the return air duct section 72. Since the air within the return air duct 72 is under suction while the air in the duct section 78 is under pressure, it is obvious that this difference in pressure assists in pushing the water downwardly through the drain holes 158. The bottom wall of the duct section 72 is arranged to drain the water into the water sump 160 within the main unit 50. The duct section 72 is provided with a projecting flange 162 which overlies the upper edge of the sump 160 as shown. The sump 160 is provided with a drain pipe 164 which serves to drain the condensate either onto the condenser coil or directly through the floor of the bus in accordance with standard practice.

The evaporator 70 and the condenser 54 are both constructed from the same type of finned tubing and are generally similar except for shape and size and therefore only the construction of the condenser has been shown in detail. Referring now to Figures 6 through 9, it will be observed that the condenser consists of a series of sections of tubing 170 of the type wherein circular fins are formed integrally with the tubing. In order to conserve on weight and space and in order to otherwise improve the equipment, the usual end plates have been eliminated and the fins of adjacent tubes are welded or brazed to one another adjacent the ends of the tube sections as indicated at 174. It has been found that heat exchange coils which do not have the coil sections rigidly secured to one another stand up exceptionally well under adverse vibration conditions. Since the fins are made of relatively light weight material, there is a certain amount of give provided between adjacent tube sections even though adjacent fins are fastened together. The various return bends 176 help to hold the tubes connected thereto in proper relationship to one another. The return bends are of the standard type which are adapted to fit into the tube sections 170. The joints between the return bends and the tube sections are preferably hydrogen brazed in accordance with standard practice. The condenser is three tubes or rows deep and twenty-one tubes or tiers high.

Referring now to Figures 1 and 7 of the drawings, it will be observed that the compressed refrigerant gas flows from the compressor 52 to the condenser 54 through the line 180 which connects to a first header section 182. The section 182 feeds the compressed gas into the seven top outer tube sections as shown. After the refrigerant has traversed the seven upper tiers of tubing, it enters a header section 184 which connects the seven upper tiers of tubing to the next lower six tiers of tubing. The refrigerant leaves these six tiers through the header section 186 which in turn directs the refrigerant into the next lower six tiers. The refrigerant leaving these then enters the header section 188 which then conveys the refrigerant into the two lowermost tiers of finned tubing and the condensed refrigerant enters the short header section 190 which is connected to the refrigerant outlet line 192 which directs the refrigerant into the receiver 193 from whence the liquid refrigerant is directed to the evaporator 70 through a conventional pressure reducing valve or restrictor 195 located in the line 197. The refrigerant vapor returns to the compressor through the line 199.

Mounting brackets 200 have been provided as shown for holding the condenser in place within the cabinet 50. These engage the condenser at spaced points at the ends of the condenser as shown. Since the condenser is not provided with the usual heavy end plates, the brackets 200 are bolted to tapped mounting blocks 202 which are hydrogen brazed or otherwise secured directly to adjacent return bends as shown. In a large coil such as a condenser, reinforcing straps 204 may be provided at spaced points as shown. These reinforcing straps 204 are brazed to the return bends and are made of light weight material which will give as the coil is jarred.

The speed of the engine 30 is controlled by means of a thermostat 120 (see Figure 10) which may be placed in any location such as in the passenger compartment of the bus where it will respond to the refrigeration requirements. This thermostat controls the speed of the engine 30 so as to cause the engine to operate at a high speed when cooling is required and at a lower speed when no cooling is required. The thermostat 120 controls the flow of current to an engine throttle control comprising a two part solenoid coil having a first coil section 122 and a second coil section 124, both of which control the operation of the plunger or armature 126 connected to the butterfly damper 130 arranged in the engine intake manifold 132 as shown. The butterfly damper 130 is provided directly in the intake manifold 132 leading from the conventional downdraft carburetor 134 to the engine 30. A conventional governor 136 is provided, as shown, for regulating the maximum speed of the engine 30. When the thermostat 120 first calls for refrigeration, the coil section 124 is short-circuited by the switch 138 whereby a large amount of current will flow through the coil section 122 and armature 126 will move the butterfly damper or throttle valve element 130 from the full line position in which it is shown in the drawings to the dotted line position. When this takes place, the engine will be caused to operate at its maximum speed. When the damper 130 moves into the high speed position, the upper end of the armature 126 forces the switch 138 to the open position, whereby the short circuit for the coil section 124 is removed. The current flowing through the coil section 122 is then required to flow through the relatively high resistance coil section 124, with the result that the amount of current drawn from the battery is very small in comparison with the amount of current required during the instant that the damper 130 is being moved from the low speed position to the high speed position. The coil section 122 is designed to have approximately 25 amperes flowing through it when connected directly to a 12 volt source of power, whereas only 400 milliamperes or thereabouts will flow through the two sections of coil when both are connected in series across the 12 volt source.

By virtue of the above described arrangement, it is possible to operate the prime mover 30 continuously so as to at all times provide air circulation irrespective of refrigeration requirements. The throttle control is designed in such a manner that when refrigeration is required, the engine 30 will be operated at its high speed and when the demand for refrigeration has been satisfied, the throttle valve element 130 will move from its dotted line position to its full line position so as to cause the prime mover 30 to operate at a reduced speed. The speed responsive clutch 68 is so designed that when the engine speed is thus reduced, the compressor becomes declutched from the jack shaft 64.

While I have shown an arrangement in which a speed responsive clutch is used for starting and stopping the operation of the refrigerant compressor, it is within the purview of this invention to provide a magnetic clutch or the like which would be used for controlling the clutching operation in response to refrigeration requirements.

For purposes of illustration, the prime mover 30 and the bus engine 22 have been shown boxed in so as to better protect any baggage or the like which may be in the engine compartment. The air circulated by the condenser fan 62 first enters through a grill 58 and then enters the air conditioning unit proper through the air inlet 60 from whence the air circulates down over the compressor and outwardly through the condenser into the outside atmosphere. If desired, duct means could be provided between the condenser air inlet grill 58 and the inlet 60. In order to simplify the disclosure, the particular means used for introducing fresh air into the conditioned air circulating system has not been shown, whereas it is understood that provision would be made for introducing fresh air into the system in accordance with standard practice. In the embodiment shown, all of the air circulating fans are operated from the main prime mover 30, whereas certain features of my invention are equally applicable to systems in which the air supply fan, for example, could be operated independently of the operation of the prime mover.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination with a bus having a passenger compartment and an engine compartment at the rear of the bus and having a bus engine located in the central rear portion of the engine compartment, air conditioning apparatus disposed within said engine compartment and comprising a self-contained portable refrigeration unit mounted on one side of the bus engine and a self-contained portable prime mover mounted on the opposite side of said bus engine, a jack shaft supported by said bus above said prime mover on the one side of the bus engine, first belt means drivingly connecting said prime mover to said jack shaft, and second belt means drivingly connecting said refrigeration unit and said jack shaft, said second belt means extending from the jack shaft on the one side of said bus to the refrigeration unit mounted on the other side of said bus engine.

2. In combination with a bus having a passenger compartment and an engine compartment at the rear of the bus and having a bus engine located in the central rear portion of the engine compartment, air conditioning apparatus disposed within said engine compartment and comprising a self-contained portable refrigeration unit mounted on one side of the bus engine and a self-contained portable prime mover mounted on the opposite side of said bus engine, a jack shaft, means for supporting said jack shaft above said prime mover, first vertically extending belt means drivingly connecting said prime mover to said jack shaft, and second horizontally extending belt means drivingly connecting said refrigeration unit and said jack shaft, said jack shaft supporting means including first means for vertically adjusting the height of said jack shaft and second means for horizontally adjusting said jack shaft.

3. In combination with a bus having a passenger compartment and a baggage compartment at the rear of the bus and having a bus engine located in the central rear portion of the baggage compartment, air conditioning apparatus disposed within said baggage compartment and comprising a self-contained portable refrigeration unit mounted on one side of the bus engine and a self-contained portable prime mover mounted on the opposite side of said bus engine, a jack shaft, first belt means drivingly connecting said prime mover to said jack shaft, second belt means drivingly connecting said refrigeration unit and said jack shaft, said second belt means extending from the jack shaft on the one side of said bus to the refrigeration unit mounted on the other side of said bus, said self-contained refrigeration unit comprising a cabinet fitting into the rear corner of the bus, refrigerant liquefying apparatus including a refrigerant compressor in the lower portion of said cabinet, an evaporator in the upper portion of the cabinet, an evaporator fan supported within the upper portion of said cabinet for circulating air to be conditioned in thermal exchange with said evaporator, a jack shaft supported within said cabinet intermediate said refrigerant liquefying apparatus and said evaporator fan, power transmitting means between said second named jack shaft and said evaporator fan, and power transmitting means between said compressor and said second named jack shaft whereby said prime mover supplies power to said compressor and said jack shaft.

4. A self-contained refrigerant system comprising in combination, a cabinet having a lower and an upper portion, a compressor within said lower portion, a condenser within said lower portion, an evaporator in the upper portion of said cabinet, the top wall of said cabinet having an inclined portion, an evaporator fan journalled on said inclined wall portion, a horizontally disposed jack shaft intermediate said compressor and said evaporator fan, power transmitting means between said jack shaft and said fan including a belt having a vertically disposed portion extending along one side of said cabinet and an inclined portion extending along said inclined wall portion, a pair of idler pulleys slidably mounted on said inclined wall portion substantially at the intersection of said inclined portion and said vertical portion, and means for individually supporting said idler pulleys for movement in a direction parallel to the face of said inclined wall portion.

5. In a self-contained air conditioning unit, an evaporator, means for directing air to be conditioned horizontally through said evaporator, an air duct section mounted adjacent the outlet of said evaporator and having an inclined surface spaced from said evaporator so as to collect droplets of water entrained by the air flowing through said evaporator, a return air duct below said first named duct section and separated from said first named duct section by means of a wall having drain holes therein whereby water collected on said inclined surface drains into said return air duct, and means for draining the water from said return air duct.

6. In a self-contained air conditioning unit, an evaporator unit including an evaporator and means for directing air to be conditioned in thermal exchange with said evaporator, an air delivery duct section mounted adjacent the outlet of said evaporator unit and having an inclined surface spaced from said evaporator so as to collect droplets of water entrained by the air flowing through said evaporator, a return air duct section for returning air to the inlet of said evaporator unit, said return air duct section being located below said first named duct section and being separated from said first named duct section by means of a wall having drain holes therein whereby water leaving said evaporator drains into said return air duct section, means for collecting the water drained into said return air duct section, and means for removably supporting said duct sections relative to said evaporator unit.

7. In a vehicle having a main enclosed body, partition means separating said body into a passenger compartment and an engine compartment, a main engine for driving said vehicle centrally disposed within said engine compartment, a self-contained air conditioning apparatus mounted adjacent one side of said engine, a prime mover for said air conditioning apparatus mounted on the other side of said engine, power transmitting means between said prime mover and said air conditioning apparatus comprising a plurality of V-belts extending from the power transmitting means on the one side of said engine to the air conditioning apparatus mounted on the other side of the bus engine.

8. In combination with a vehicle having an enclosed body, partition means separating the interior of said body into a passenger compartment and an engine compartment, air conditioning apparatus including a refrigerant compressor and a prime mover for said compressor located in said engine compartment, means for supplying air cooled by said apparatus to said passenger compartment, power transmitting means between said prime mover and said compressor including a speed responsive clutch operable to declutch said compressor from said prime mover at speeds below a predetermined value, said prime mover comprising an internal combustion engine having a throttle valve for controlling the speed thereof, solenoid means including an armature for operating said throttle valve and including a first coil portion which when energized moves said armature and said throttle valve to a given position, and means responsive to the temperature of the air in said passenger compartment for controlling the energization of said first coil portion, said solenoid means including a second coil portion normally in series with said first coil portion and means for shorting said second coil portion in one position of said armature.

9. In combination with a bus having a passenger compartment at the front end of the bus and a baggage compartment at the rear end of the bus and having a bus engine located in the central rear portion of the baggage compartment, air conditioning apparatus disposed within said baggage compartment and comprising a self-contained portable refrigeration system mounted on one side of the bus engine, said refrigeration system including an evaporator unit having an evaporator and an evaporator fan for circulating air to be conditioned in thermal exchange with said evaporator, an air delivery duct section mounted adjacent the air outlet of said evaporator unit and having an inclined surface spaced from said evaporator so as to collect droplets of water entrained by the air flowing through said evaporator, a return air duct section carried by said unit for returning air to the inlet of said evaporator unit, said return air duct section being located below said first named duct section and being separated from said first named duct section by means of a wall having drain holes therein whereby water leaving said evaporator drains into said return air duct section, means for collecting the water drained into said return air duct section, and means for removably supporting said duct section relative to said evaporator unit.

10. In combination with a bus having a passenger compartment at the front end thereof and a baggage compartment at the rear end thereof and having a bus engine located in the central rear portion of the baggage compartment, air conditioning apparatus disposed within said baggage compartment and comprising a self-contained portable refrigeration unit mounted on one side of the bus engine and a self-contained portable prime mover mounted on the opposite side of said bus engine, said refrigeration unit comprising an evaporator and a fan for circulating air to be conditioned in thermal exchange relationship with said evaporator, a wall separating said passenger compartment from said baggage compartment and having an air return grill provided therein, and air duct means removably secured to said air conditioning apparatus and including means for directing air from said air return grill to the inlet of said evaporator fan.

11. In a vehicle having a main body, partition means separating said body into a passenger compartment and a baggage compartment, a main engine for driving said vehicle, said engine being centrally disposed within said baggage compartment, said baggage compartment being located at the rear of the bus and having a curved outer wall, a self-contained air conditioning unit including an evaporator compartment and a condenser compartment disposed on one side of said bus engine adjacent said curved wall portion, said unit including a refrigerant condenser located adjacent said outer wall and having a curved contour corresponding to the contour of said wall, a prime mover for said air conditioning unit mounted on the other side of said main engine, and air inlet and outlet means provided in the wall of said body adjacent said prime mover through which air for cooling the prime mover may flow.

12. In combination with a bus having a first compartment for passengers and having a second compartment separated from said passenger compartment by means of a partition, air conditioning apparatus disposed within said second compartment and comprising a self-contained portable refrigeration unit and a self-contained portable prime mover, a jack shaft, means for supporting said jack shaft, first belt means drivingly connecting said prime mover to said jack shaft, and second belt means drivingly connecting said refrigeration unit to said jack shaft, said jack shaft supporting means including first means for adjusting the position of said jack shaft relative to said prime mover and second means for adjusting said jack shaft relative to said refrigeration unit.

13. In combination with a bus having a passenger compartment and an engine compartment and having a bus engine located in the engine compartment, air conditioning apparatus disposed within said engine compartment and comprising a self-contained portable refrigeration unit mounted on one side of the bus engine and a self-contained portable prime mover mounted on the opposite side of said bus engine, a jack shaft, means for supporting said jack shaft, first belt means drivingly connecting said prime mover to said jack shaft, and second belt means drivingly connecting said refrigeration unit and said jack shaft, said jack shaft supporting means including first means for adjusting the position of said jack shaft relative to said prime mover and second means for adjusting said jack shaft relative to said refrigeration unit.

14. In combination with a bus having a first passenger compartment and a second compartment and having a bus engine located in the second compartment, air conditioning apparatus disposed within said second compartment and comprising a self-contained portable refrigeration unit mounted on one side of the bus engine and a self-contained portable prime mover mounted on the opposite side of said bus engine, said refrigeration unit comprising an evaporator and a fan for circulating air to be conditioned in thermal exchange relationship with said evaporator, a wall separating said passenger compartment from said second compartment and having an air return grill provided therein, and air duct means removably secured to said air conditioning apparatus and including means for directing air from said air return grill to the inlet of said evaporator fan.

15. In combination with a vehicle having an enclosed body, partition means separating the interior of said body into a first compartment and a second compartment, self-contained air conditioning apparatus including a cabinet in which is mounted a refrigerant compressor, a prime mover for said compressor located in said second compartment and outside of said cabinet, means for supplying air cooled by said apparatus to said first compartment, power transmitting means between said prime mover and said compressor including a speed responsive clutch located outside said cabinet and operable to declutch said compressor from said prime mover at speeds below a predetermined value, said prime mover comprising an internal combustion engine having a throttle valve for controlling the speed thereof, means for operating said throttle valve including a control means which when actuated moves said throttle valve to a given position, and means responsive to the temperature of the air in said first compartment for controlling the operation of said control means.

LEON L. KUEMPEL.

REFERENCES CITED

The following references are of record in the file of this patent:

UNITED STATES PATENTS

| Number | Name | Date |
|---|---|---|
| 1,789,880 | Price | Jan. 20, 1931 |
| 2,053,206 | Sargent | Sept. 1, 1936 |
| 2,257,164 | Euwer | Sept. 30, 1941 |
| 2,322,145 | Kritzer | June 15, 1943 |
| 2,479,170 | Kuempel | Aug. 16, 1949 |